April 25, 1944.   E. HIGGINS   2,347,479
VARIABLE SPEED TRANSMISSION
Filed Nov. 2, 1942   2 Sheets-Sheet 1

INVENTOR.
Eugene Higgins
BY
Earl F. Chappell
ATTORNEYS

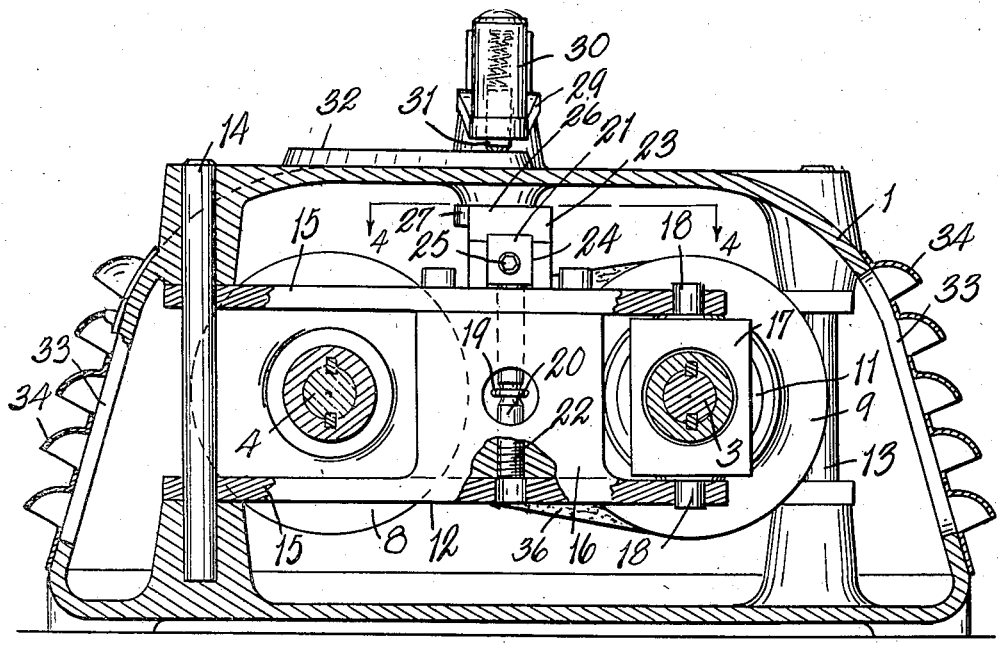
Fig. 3.
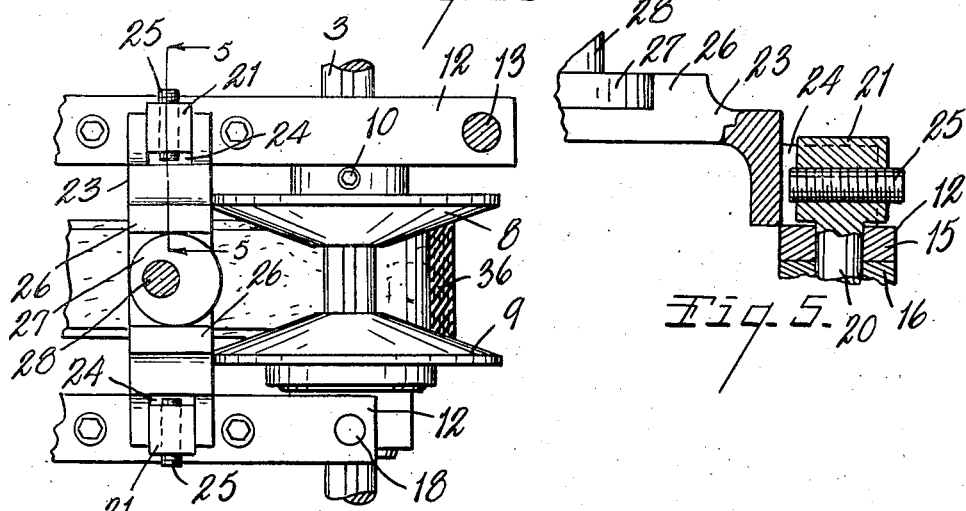
Fig. 4.
Fig. 5.

Patented Apr. 25, 1944

2,347,479

UNITED STATES PATENT OFFICE 2,347,479

VARIABLE SPEED TRANSMISSION

Eugene Higgins, Jackson, Mich.

Application November 2, 1942, Serial No. 464,158

15 Claims. (Cl. 74—230.17)

This invention relates to improvements in variable speed transmissions.

The main objects of this invention are:

First, to provide a variable speed transmission of the pulley type which is very compact and may be easily and accurately adjusted throughout its range of speeds.

Second, to provide a variable speed transmission of the V-belt cone pulley type in which the stress and wear upon the pulleys and belt is minimized.

Third, to provide a variable speed belt transmission in which the driving friction is effectively maintained and is practically constant throughout the range of adjustments.

Fourth, to provide a structure having these advantages which is quite simple and economical in its parts.

Objects relating to details and economies of the invention will appear from the description to follow. The invention is defined and pointed out in the claims.

A preferred embodiment of the invention is illustrated in the accompanying drawings, in which:

Fig. 3 is a fragmentary view partially in vertical section on the broken line 3—3 of Fig. 1.

Fig. 4 is a fragmentary view partially in section on line 4—4 of Fig. 3.

Fig. 5 is an enlarged fragmentary view partially in section on line 5—5 of Fig. 4.

Figure 1:
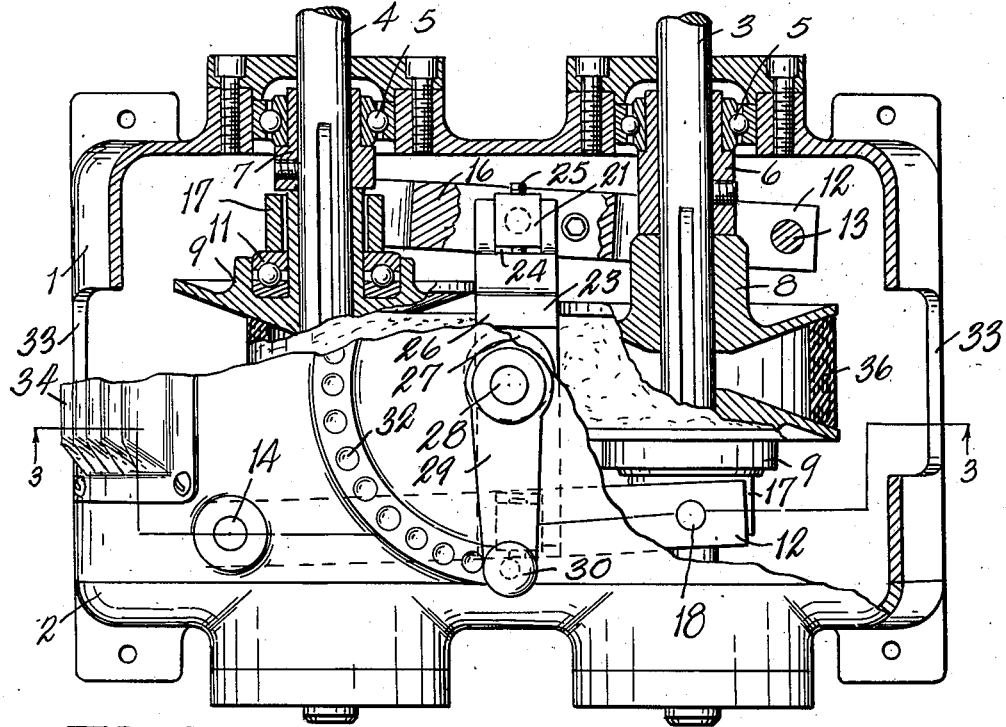
Fig. 1 is a fragmentary plan view partially in horizontal section of a transmission embodying the features of my invention.
Figure 2:
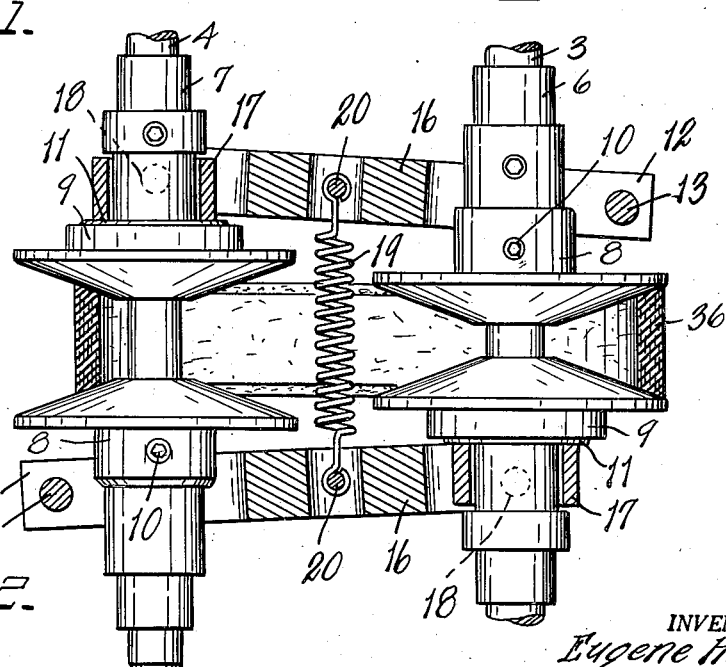
Fig. 2 is a fragmentary view partially in horizontal section showing the arrangement of the shafts and pulley members and the relation of the control levers thereto.

In the embodiment of my invention illustrated, I provide a housing comprising a main body section 1 and a complementary removable side section 2. The housing is suitably designed to receive and support the parts including the driving shaft 3 and the driven shaft 4. These shafts are supported in suitable bearings 5, the shafts being provided with bearing sleeves 6 and 7. It will be understood that either shaft might be the driving shaft.

Each shaft is provided with a pair of coacting cone pulley members 8 and 9, the pulley members 8 in the embodiment illustrated being fixed to the shaft to rotate therewith by the screws 10. The pulley members 9 are splined to their respective shafts for axial movement thereon and they are provided with thrust bearings 11, these bearings in the embodiment illustrated being ball bearings.

The levers 12 are arranged on opposite sides of the pulley members, one lever being pivoted at one end at 13 and the other at the opposite end at 14. The levers are, in the embodiment illustrated, made up of a pair of upper and lower lever members 15 connected centrally thereof by the block or cross piece 16. This, in effect, provides levers bifurcated at each end.

At their swinging ends, the levers carry thrust blocks 17 provided with journals 18, this providing a swiveling or pivotal connection for the thrust members 17 which coact with the thrust bearings 11 of the axial movable pulley members.

In the embodiment illustrated, only one of the pulley members of each pair is mounted for axial movement but I contemplate that in certain embodiments or adaptations it might be desirable to make both pulley members axially adjustable. The embodiment illustrated, however, is entirely practical.

The lever members are yieldingly urged towards each other by the spring 19 which is connected at its ends to the stems 20 of the thrust members 21. These thrust members 21 are, in the embodiment illustrated, block-like in form and constitute heads for the stems 20 which are loosely threaded at 22 into the lever cross member 16. This loose threading provides for a swiveling movement of the thrust members under the action of the shifting bar 23 which has longitudinal slots 24 in the ends thereof receiving thrust members 21. The screws 25 constitute adjustable tappets for the thrust members 21.

The shifting bar 23 is slidably supported on the upper lever members for longitudinal movement and is provided with a yoke 26 engaged by the eccentric 27 on the vertical shaft 28. This shaft 28 is provided with a hand lever 29 having a grip 30, the hand lever being provided with a spring detent 31 coacting with the retaining segment 32 having spaced recesses therein with which the detent may be selectively engaged, thus holding the lever and its attached parts in their adjusted positions.

By shifting the shifting bar through the means described, in one direction, the lever releases the thrust on the pulley member it controls, allowing it to move outwardly and at the same time the spring 19 yieldingly acts on the other movable pulley member through the lever connection to urge it inwardly so that one pair of pulley members are closed as the other is opened, thus keeping a substantially uniform pressure on the belt throughout the full range of movement and relieves the belt 16 of any objectionable compressing stresses during the period of adjustment, consequently minimizing wear and objectionable stresses on the belts and also on the pulleys. The adjustable tappet members provide for a lost motion connection so that great accuracy in manufacture is not required and so that the desired adjustment results—that is, adjustment without undesirable strain or pressure being on any of the parts.

The housing is provided with ventilating openings 33 at the ends thereof provided with louvers 34.

I have illustrated and described my invention in an embodiment which I consider very practical. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. In a variable speed transmission, the combination with driving and driven shafts, of a pair of coacting cone pulley members on each shaft, both of the pulley members of the pairs being rotatable with their respective shafts, at least one of the pulley members of each pair being splined to its shaft for axial movement thereon and being provided with an axial thrust bearing, a V-belt coacting with said pulleys, levers disposed on opposite sides of the pulleys and pivoted at their opposite ends, said levers comprising spaced pairs of lever members having connecting cross members intermediate the ends thereof, the swinging ends of said levers being provided with thrust collars swiveled between the lever members to coact with the thrust bearings of said axially movable pulley members, a shifting bar slotted at its ends disposed centrally between the pairs of pulleys and slidably supported at its ends on the upper lever members, thrust blocks engaged in said slots in said shifting bar and provided with stems loosely threaded into said lever cross members whereby they are supported for swiveling movement in spaced relation to the upper lever members, thrust members adjustably mounted on said thrust blocks to coact with the inner ends of said slots of said shifting bar providing for lost motion engagement of said shifting bar with said thrust blocks, a spring connected at its ends to said stems of said thrust blocks, and means for actuating said shifting bar.

2. In a variable speed transmission, the combination with driving and driven shafts, of a pair of coacting cone pulley members on each shaft, both of the pulley members of the pairs being rotatable with their respective shafts, at least one of the pulley members of each pair being splined to its shaft for axial movement thereon and being provided with an axial thrust bearing, a V-belt coacting with said pulleys, levers disposed on opposite sides of the pulleys and pivoted at their opposite ends, the swinging ends of said levers being provided with thrust collars coacting with the thrust bearings of said axially movable pulley members, a shifting bar slotted at its ends disposed centrally between the pairs of pulleys and slidably supported at its ends on the levers, thrust blocks engaged in said slots in said shifting bar and having pivotal engagement with said levers, thrust members adjustably mounted on said thrust blocks to coact with the inner ends of said slots of said shifting bar providing for lost motion engagement of said shifting bar with said thrust blocks, a spring connected at its ends to said levers, and means for actuating said shifting bar.

3. In a variable speed transmission, the combination with driving and driven shafts, of a pair of coacting cone pulley members on each shaft, both of the pulley members of the pairs being rotatable with their respective shafts, at least one of the pulley members of each pair being splined to its shaft for axial movement thereon and being provided with an axial thrust bearing, a V-belt coacting with said pulleys, levers disposed on opposite sides of the pulleys and pivoted at their opposite ends, said levers comprising spaced pairs of lever members having connecting cross members intermediate the ends thereof, the swinging ends of said levers being provided with thrust collars swiveled between the lever members to coact with the thrust bearings of said axially movable pulley members, a shifting bar slotted at its ends disposed centrally between the pairs of pulleys and slidably supported at its ends on the upper lever members, thrust blocks engaged in said slots in said shifting bar and provided with stems loosely threaded into said lever cross members whereby they are supported for swiveling movement in spaced relation to the upper lever members, a spring connected at its ends to said stems of said thrust blocks, and means for actuating said shifting bar.

4. In a variable speed transmission, the combination with driving and driven shafts, of a pair of coacting cone pulley members on each shaft, both of the pulley members of the pairs being rotatable with their respective shafts, at least one of the pulley members of each pair being splined to its shaft for axial movement thereon and being provided with an axial thrust bearing, a V-belt coacting with said pulleys, levers disposed on opposite sides of the pulleys and pivoted at their opposite ends, the swinging ends of said levers being provided with thrust collars coacting with the thrust bearings of said axially movable pulley members, a shifting bar slotted at its ends disposed centrally between the pairs of pulleys and slidably supported at its ends on the levers, thrust blocks engaged in said slots in said shifting bar and having pivotal engagement with said levers, a spring connected at its ends to said levers, and means for actuating said shifting bar.

5. In a variable speed transmission, the combination with driving and driven shafts, of a pair of coacting cone pulley members on each shaft, both of the pulley members of the pairs being rotatable with their respective shafts, at least one of the pulley members of each pair being splined to its shaft for axial movement thereon and being provided with an axial thrust bearing, a V-belt coacting with said pulleys, levers disposed on opposite sides of the pulleys and pivoted at their opposite ends, said levers comprising spaced pairs of lever members having connecting cross members intermediate the ends thereof, the swinging ends of said levers being provided with thrust collars swiveled between the lever members to coact with the thrust bearings of said axially movable pulley members, a shifting bar slotted at its ends disposed centrally between the pairs of pulleys and slidably supported at its ends on the upper lever members, thrust blocks engaged in said slots in said shifting bar and provided with stems loosely threaded into said lever cross members whereby they are supported for swiveling movement in spaced relation to the upper lever members, thrust members adjustably mounted on said thrust blocks to coact with the inner ends of said slots of said shifting bar providing for lost motion engagement of said shifting bar with said thrust blocks, a spring connected at its ends to said stems of said thrust blocks, and an actuating shaft provided with a hand lever at its outer end and with an eccentric at its inner end, the shifting bar being provided with a yoke coacting with said eccentric.

6. In a variable speed transmission, the combination with driving and driven shafts, of a pair of coacting cone pulley members on each shaft, both of the pulley members of the pairs being rotatable with their respective shafts, at least one of the pulley members of each pair being splined to its shaft for axial movement thereon and being provided with an axial thrust bearing, a V-belt coacting with said pulleys, levers disposed on opposite sides of the pulleys and pivoted at their opposite ends, said levers comprising spaced pairs of lever members having connecting cross members intermediate the ends thereof, the swinging ends of said levers being provided with thrust collars swiveled between the lever members to coact with the thrust bearings of said axially movable pulley members, and a spring disposed between said pulleys and connected at its ends to said lever cross members, and operating connections for said levers.

7. In a variable speed transmission, the combination with driving and driven shafts, of a pair of coacting cone pulley members on each shaft, both of the pulley members of the pairs being rotatable with their respective shafts, at least one of the pulley members of each pair being splined to its shaft for axial movement thereon and being provided with an axial thrust bearing, a V-belt coacting with said pulleys, levers disposed on opposite sides of the pulleys and pivoted at their opposite ends, the swinging ends of said levers being provided with thrust collars coacting with the thrust bearings of said axially movable pulley members, a spring disposed between said pulleys and connected at its ends to said levers, and means common to both levers for selectively actuating either lever while permitting simultaneous spring actuation of the other lever.

8. In a variable speed transmission, the combination with driving and driven shafts, of a pair of coacting cone pulley members on each shaft, both of the pulley members of the pairs being rotatable with their respective shafts, at least one of the pulley members of each pair being associated with its shaft for axial movement thereon, a V-belt coacting with said pulleys, levers disposed on opposite sides of the pulleys to coact with said axially movable pulley members, a shifting bar, adjustable thrust members on said levers coacting with said shifting bar, said thrust members and shifting bar having lost motion engagement, a spring disposed between said pulleys and connected at its ends to said levers, said spring being normally under tension, and an actuating shaft provided with a hand lever at its outer end and with an eccentric at its inner end, said shifting bar being provided with a yoke coacting with said eccentric.

9. In a variable speed transmission, the combination with driving and driven shafts, of a pair of coacting cone pulley members on each shaft, both of the pulley members of the pairs being rotatable with their respective shafts, at least one of the pulley members of each pair being associated with its shaft for axial movement thereon, a V-belt coacting with said pulleys, levers disposed on opposite sides of the pulleys, said levers being pivoted at opposite ends with their swinging ends operatively associated with one of said axially movable pulley members, a shifting bar, thrust members on said levers coacting with said shifting bar when the shifting bar is actuated in one direction only, a spring connected at its ends to said levers to yieldingly urge said axially movable pulley members inwardly, and an actuating means for said shifting bar.

10. In a variable speed transmission, the combination with driving and driven shafts, of a pair of coacting cone pulley members on each shaft, both of the pulley members of the pairs being rotatable with their respective shafts, at least one of the pulley members of each pair being associated with its shaft for axial movement thereon, a V-belt coacting with said pulleys, levers disposed on opposite sides of the pulleys, said levers being pivoted at opposite ends with their swinging ends operatively associated with one of said axially movable pulley members, a spring connection to both of said levers, said spring being normally under tension and acting to urge said axially movable pulley members inwardly, and an actuating means common to both levers for selectively actuating either of said levers in one direction, the said spring connection acting to actuate the levers in the other direction.

11. In a variable speed transmission, the combination with driving and driven shafts, of a pair of coacting cone pulley members on each shaft, both of the pulley members of the pairs being rotatable with their respective shafts, at least one of the pulley members of each pair being associated with its shaft for axial movement thereon, a V-belt coacting with said pulleys, levers disposed to coact with said axially movable pulley members, means for actuating said levers including a shifting bar slotted at its ends, coacting thrust members on said levers engaging said slots and provided with adjustable tappet members, a manually operated eccentric, said shifting bar being provided with a yoke coacting with said eccentric, and spring means common to both levers and acting to yieldingly actuate one lever when the other is positively actuated through said shifting bar.

12. In a variable speed transmission, the combination with driving and driven shafts, of a pair of coacting cone pulley members on each shaft, both of the pulley members of the pairs being rotatable with their respective shafts, at least one of the pulley members of each pair being associated with its shaft for axial movement thereon, a V-belt coacting with said pulleys, levers disposed on opposite sides of said pulley members, said levers being pivoted at opposite ends with their swinging ends coacting with one of said axially movable pulley members, means for actuating said levers including a shifting bar, thrust members on said levers coacting with said shifting bar when it is shifted in one direction only, and spring means common to both levers and acting to yieldingly actuate one lever to apply yielding pressure to the pulley member associated therewith when the other is positively actuated through said shifting bar.

13. In a variable speed transmission, the combination with driving and driven shafts, of a pair of coacting cone pulley members on each shaft, both of the pulley members of the pairs being rotatable with their respective shafts and at least one of the pulley members of each pair being associated with its shaft for axial movement thereon, a V-belt coacting with said pulleys, levers pivotally mounted at their opposite ends with their swinging ends operatively associated with the axially movable pulley member of one of the pairs of pulley members, spring means common to both levers acting to yieldingly urge the pulley members toward each other, and means for selectively actuating said levers in one direction only, said spring acting to yieldingly actuate the levers in the other direction.

14. In a variable speed transmission, the combination with driving and driven shafts, of a pair of coacting cone pulley members on each shaft, both of the pulley members of the pairs being rotatable with their respective shafts and at least one of the pulley members of each pair being associated with its shaft for axial movement thereon, a V-belt coacting with said pulleys, levers pivotally mounted at their opposite ends with their swinging ends operatively associated with the axially movable pulley member of one of the pairs of pulley members, spring means simultaneously acting to urge the pulley members toward each other, and means for positively and selectively actuating said levers in one direction and simultaneously freeing the other lever for actuation by said spring.

15. In a variable speed transmission, the combination with driving and driven shafts, of a pair of cone pulley members on each shaft, both of the pulley members being rotatable with their respective shafts, the diagonally opposite pulley member of the pair being associated with its shaft for axial movement thereon, a V-belt coacting with said pulleys, levers disposed in opposed relation at the outer sides of said pulleys and pivoted at opposite ends with their swinging ends operatively associated with the axially movable pulley members, a tension spring connecting said levers and acting to urge both axially movable pulley members inwardly, and a manually controlled shifting means for said levers for positively and selectively actuating one of said levers outwardly to permit the outward movement of the pulley member associated therewith while freeing the other lever to permit the inward movement thereof under the action of said spring.

EUGENE HIGGINS.